United States Patent
Miyoshi

(10) Patent No.: US 10,810,047 B2
(45) Date of Patent: Oct. 20, 2020

(54) INFORMATION PROCESSING DEVICE, INFORMATION PROCESSING METHOD, AND COMPUTER-READABLE RECORDING MEDIUM STORING PROGRAM

(71) Applicant: FUJITSU LIMITED, Kawasaki-shi, Kanagawa (JP)

(72) Inventor: Takashi Miyoshi, Ohta (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/366,528

(22) Filed: Mar. 27, 2019

(65) Prior Publication Data
US 2019/0347136 A1 Nov. 14, 2019

(30) Foreign Application Priority Data

May 8, 2018 (JP) .................................. 2018-090015

(51) Int. Cl.
*G06F 9/50* (2006.01)
*G06F 13/12* (2006.01)
*G06F 11/30* (2006.01)
*G06F 11/34* (2006.01)

(52) U.S. Cl.
CPC ........ *G06F 9/5044* (2013.01); *G06F 11/3031* (2013.01); *G06F 11/3423* (2013.01); *G06F 13/12* (2013.01)

(58) Field of Classification Search
CPC ............... G06F 9/5044; G06F 11/3031; G06F 11/3423; G06F 13/12
See application file for complete search history.

(56) References Cited

U.S. PATENT DOCUMENTS

| | | | |
|---|---|---|---|
| 9,244,740 B2 * | 1/2016 | Akimoto | G06F 9/505 |
| 10,050,884 B1 * | 8/2018 | Dhanabalan | H04L 47/122 |
| 2003/0135609 A1 * | 7/2003 | Carlson | G06F 9/5011 |
| | | | 709/224 |
| 2006/0271765 A1 | 11/2006 | Tell et al. | |
| 2008/0298236 A1 * | 12/2008 | Ervin | H04L 47/10 |
| | | | 370/232 |

(Continued)

FOREIGN PATENT DOCUMENTS

| | | |
|---|---|---|
| JP | 2008-546072 | 12/2008 |
| JP | 2014-170363 | 9/2014 |

*Primary Examiner* — Tim T Vo
*Assistant Examiner* — Phong H Dang
(74) *Attorney, Agent, or Firm* — Fujitsu Patent Center

(57) ABSTRACT

An information processing device includes a processor; and an offload circuit coupled to the processor via links, the offload circuit including: a first circuit that computes processes of applications, a second circuit that collects values indicating performance information of the links for flows corresponding to the processes of the applications and maximum values indicated in performance information and usable by the links, and a third circuit that determines a flow not satisfying requested performance information based on the values indicating the performance information of the links for the flows, selects a link to which the flow is to be allocated, based on the maximum values indicated in the performance information and usable by the links and values indicated in performance information and currently used by the links, and allocates the flow to the selected link.

10 Claims, 8 Drawing Sheets

(56) References Cited

U.S. PATENT DOCUMENTS

| | | | |
|---|---|---|---|
| 2010/0182920 A1* | 7/2010 | Matsuoka | H04L 43/00 370/252 |
| 2011/0231685 A1* | 9/2011 | Huang | G06F 1/3203 713/321 |
| 2014/0056141 A1* | 2/2014 | Breternitz, Jr. | H04L 49/10 370/235 |
| 2014/0250287 A1 | 9/2014 | Akimoto | |

* cited by examiner

FIG. 5

| FLOW ID | FLOW INFORMATION ||| LINK INFORMATION | PRIORITY 0: LOWEST TO 255: HIGHEST | PERFORMANCE INFORMATION (CURRENT VALUES) |||
|---|---|---|---|---|---|---|---|---|
| | USER LOGIC BLOCK | COMMAND TYPE | ADDRESS RANGE | | | APPLICATION INFORMATION | UL PERFORMANCE | BANDWIDTH USED |
| 1 | UL1 | Read | All | L1 | 10 | OK | NG | 10 GB/s |
| 2 | UL1 | Write | All | L1 | 1 | OK | OK | 1 GB/s |
| 3 | UL2 | R/W | All | L1 | 11 | NG | OK | 20 GB/s |
| 4 | UL3 | R/W | 0x0000-0xFFFF | L2 | 12 | OK | OK | 30 GB/s |
| 5 | UL3 | R/W | 0x10000-0x1FFF | L2 | 10 | OK | OK | 10 GB/s |
| ... | ... | ... | ... | ... | ... | ... | ... | ... |

| LINK ID | PERFORMANCE INFORMATION | | |
|---|---|---|---|
| | MAXIMUM BANDWIDTH | MINIMUM DELAY | ... |
| L1 | 50 GB/s | 1000 ns | ... |
| L2 | 20 GB/s | 300 ns | ... |
| L3 | 10 GB/s | 100 ns | ... |
| ... | ... | ... | ... |

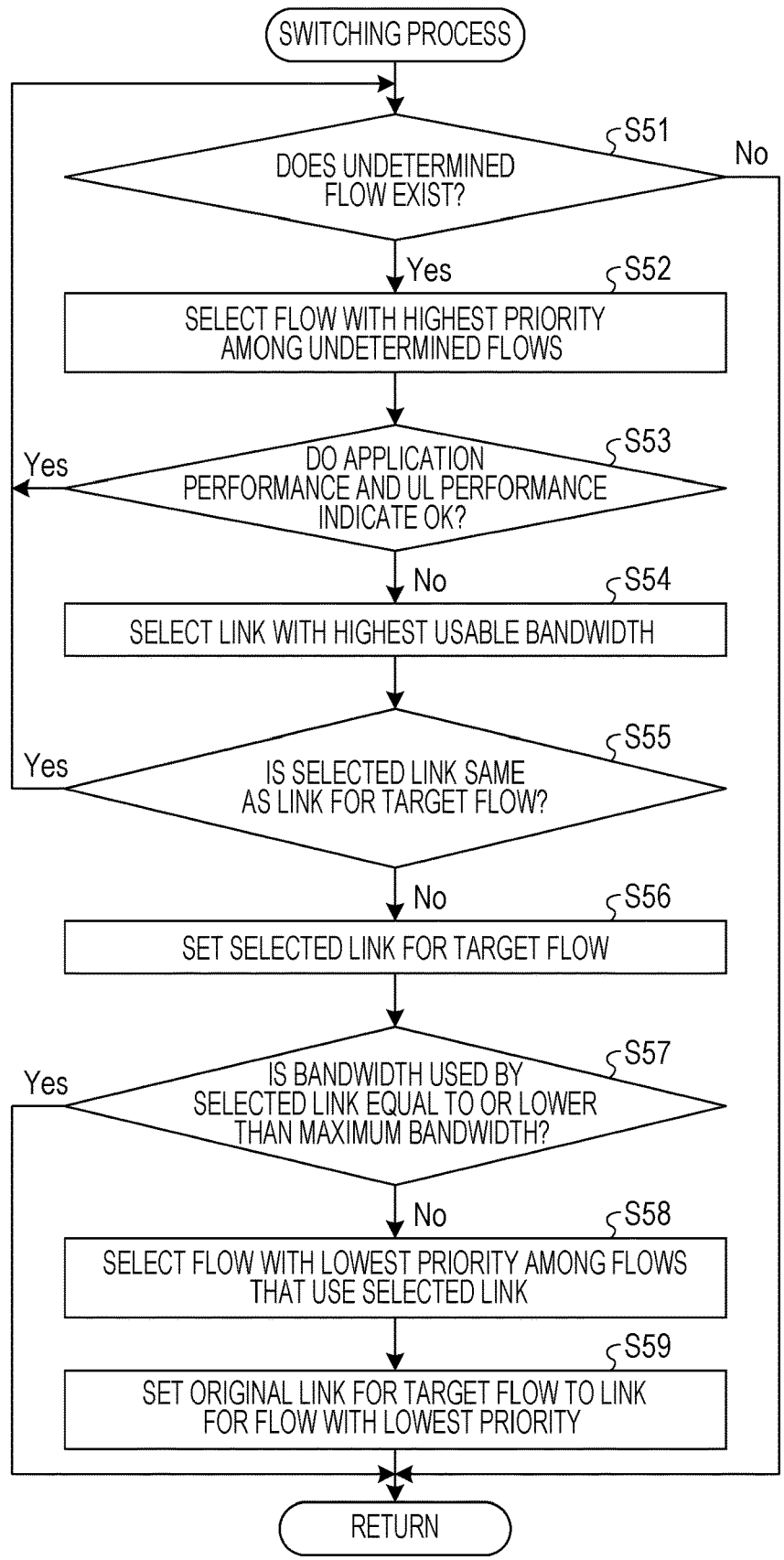

INFORMATION PROCESSING DEVICE, INFORMATION PROCESSING METHOD, AND COMPUTER-READABLE RECORDING MEDIUM STORING PROGRAM

CROSS-REFERENCE TO RELATED APPLICATION

This application is based upon and claims the benefit of priority of the prior Japanese Patent Application No. 2018-90015, filed on May 8, 2018, the entire contents of which are incorporated herein by reference.

FIELD

The embodiments discussed herein are related to an information processing device, an information processing method, and a computer-readable recording medium storing a program.

BACKGROUND

In recent years, a technique for offloading, for speeding, an application to be executed by a central processing unit (CPU) to hardware such as a field programmable gate array (FPGA) and executing the application has been proposed. A portion of the offloaded application is referred to as a user logic block (a part of offload circuit). Multiple user logic blocks may be installed in one FPGA device. It is assumed that an arbitrary combination of the multiple user logic blocks is executed based on the application to be executed by the CPU. Between the CPU and the FPGA, a link connection via an input and output (I/O) bus such as PCI Express (hereinafter also referred to as PCIe) and a link connection via a memory coherent bus such as Open Coherent Accelerator Processor Interface (OpenCAPI) exist.

The link connection via the I/O bus causes access delay to be long and does not enable the CPU to execute caching. In the link connection via the I/O bus, a bandwidth is a middle to high bandwidth. The link connection via the I/O bus is suitable for direct memory access (DMA) transfer from the FPGA. The link connection via the memory coherent bus causes access delay to be short, enables the CPU to execute caching, and enables the FPGA to make access to a memory. In the link connection via the memory coherent bus, a bandwidth is a low to middle bandwidth. As link connections between the CPU and the FPGA, both the connection via the I/O bus and the connection via the memory coherent bus may be prepared. In this case, the user logic blocks fixedly select links in advance.

Examples of related art are Japanese Laid-open Patent Publication No. 2014-170363 and Japanese National Publication of International Patent Application No. 2008-546072.

SUMMARY

According to an aspect of the embodiments, an information processing device includes a processor; and an offload circuit coupled to the processor via links, the offload circuit including: a first circuit that computes processes of applications, a second circuit that collects values indicating performance information of the links for flows corresponding to the processes of the applications and maximum values indicated in performance information and usable by the links, and a third circuit that determines a flow not satisfying requested performance information based on the values indicating the performance information of the links for the flows, selects a link to which the flow is to be allocated, based on the maximum values indicated in the performance information and usable by the links and values indicated in performance information and currently used by the links, and allocates the flow to the selected link.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of a flow table;

FIG. 6 is a diagram illustrating an example of a link table;

FIG. 8 is a flowchart illustrating an example of a switching process according to the embodiment.

DESCRIPTION OF EMBODIMENTS

A certain user logic block (a part of offload circuit) does not recognize a link to be used by another user logic block until an operation. Thus, for example, when flows, each of which indicates a combination of a command type and an address range, are allocated as units to links, performance requested for an application may not be satisfied due to the fact that a bandwidth of a link is lower than a bandwidth requested for a flow.

Hereinafter, embodiments of an information processing device disclosed herein, an information processing method disclosed herein, and an PROGRAM disclosed herein are described in detail with reference to the accompanying drawings. Techniques disclosed herein are not limited by the embodiments. The following embodiments may be combined without contradiction.

EMBODIMENTS

Figure 1:
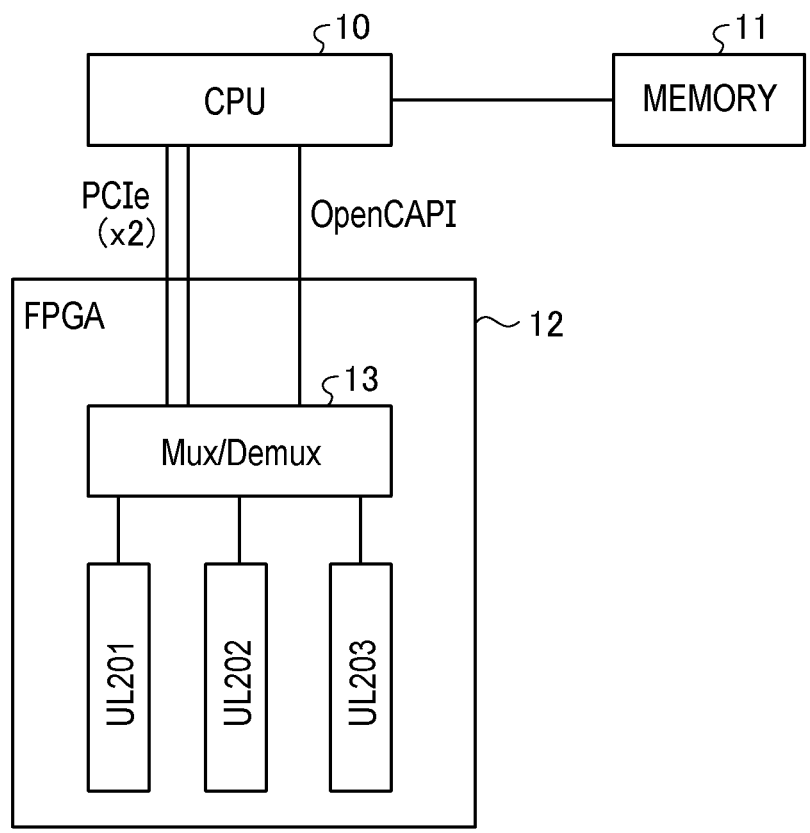
FIG. 1 is a diagram illustrating an example in which a CPU and an FPGA are coupled to each other via multiple links.

First, the case where a bandwidth of a link is not sufficient is described with reference to FIG. 1. FIG. 1 is a diagram illustrating an example in which a CPU and an FPGA are coupled to each other via multiple links. In the example illustrated in FIG. 1, a CPU 10 is coupled to a memory 11, and a connection via PCIe and a connection via OpenCAPI are prepared as links between the CPU 10 and an FPGA 12. User logic blocks UL201 to UL203 are coupled to PCIe and OpenCAPI via a Mux/Demux 13. A programmable logic device and a complex programmable logic device may be collectively called as the FPGA. The CPU 10 may be a single CPU, a multiple-CPU, or a multi-core CPU. A processor may include the CPU 10.

It is assumed that PCIe is PCIe Gen4 with 16 lanes and 2 slots and that in PCIe, a bandwidth is 51.2 GB/s and access delay is 1 μs or longer for purposes of explanation. In addition, it is assumed that in OpenCAPI, a bandwidth is 25.6 GB/s and access delay is 100 ns or longer. Performance requested for the user logic block UL201 is a bandwidth of 10 GB/s and allowable access delay of 200 ns. Performance requested for the user logic block UL202 is a bandwidth of 40 GB/s and allowable access delay of 2 μs. Performance requested for the user logic block UL203 is a bandwidth of 20 GB/s and allowable access delay of 1 μs.

It is assumed that the user logic blocks UL201 to UL203 fixedly select links to be used by the user logic blocks UL201 to UL203 in advance. In addition, it is assumed that links to be used by other user logic blocks are not clear until an operation. In this case, in the example illustrated in FIG. 1, the user logic block UL201 is allocated to OpenCAPI, and the user logic block UL202 is allocated to PCIe. However, when the user logic block UL203 is allocated to any of OpenCAPI and PCIe, the bandwidth requested for the user logic block UL203 exceeds the bandwidth of the link. FIG. 1 illustrates an example in which a bandwidth of a link is lower than for a bandwidth requested for a flow and performance requested for an application is not satisfied. On the other hand, when it is possible to dynamically allocate communication of the user logic block UL203 to the 2 links with different characteristics, the performance of an entire system may be improved.

Figure 2:
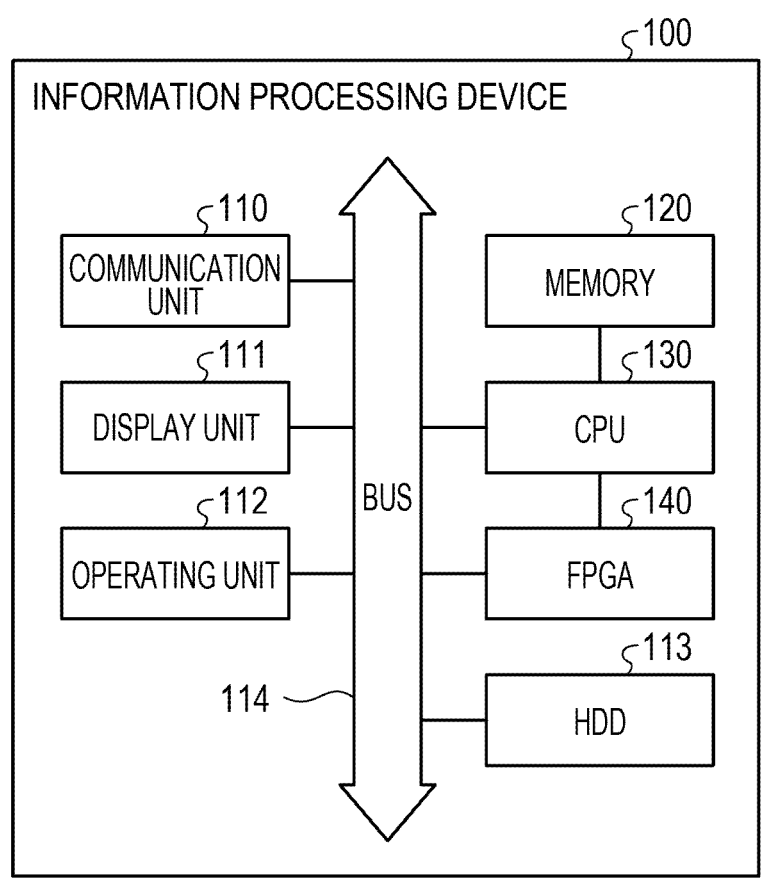
FIG. 2 is a block diagram illustrating an example of a hardware configuration of an information processing device according to an embodiment.

FIG. 2 is a block diagram illustrating an example of a hardware configuration of an information processing device according to an embodiment. As illustrated in FIG. 2, an information processing device 100 includes a communication unit 110, a display unit 111, an operating unit 112, a hard disk drive (HDD) 113, a memory 120, a CPU 130, and an FPGA 140. The communication unit 110, the display unit 111, the operating unit 112, the HDD 113, the memory 120, the CPU 130, and the FPGA 140 are coupled to each other via a bus 114. The CPU 130 is coupled to the memory 120 and the FPGA 140. The information processing device 100 may include not only the function units illustrated in FIG. 2 but also various function units, which are included in a known computer and are an input device, an audio output device, and the like.

The communication unit 110 is enabled by, for example, a network interface card (NIC) or the like. The communication unit 110 is a communication interface coupled to another information processing device via a network (not illustrated) by a wired or wireless connection and configured to communicate information with the other information processing device.

The display unit 111 is a display device that displays various types of information. The display unit 111 is enabled by, for example, a liquid crystal display or the like as the display device. The display unit 111 displays various screens including a display screen input from the CPU 130 via a display controller not illustrated.

The operating unit 112 is an input device that receives various operations from a user of the information processing device 100. The operating unit 112 is enabled by, for example, a keyboard, a mouse, or the like as the input device. The operating unit 112 outputs, as operation information, information of an operation input by the user to the CPU 130. The operating unit 112 may be enabled by a touch panel or the like as the input device. The display device as the display unit 111 and the input device as the operating unit 112 may be integrated with each other.

The HDD 113 is an auxiliary storage device and stores various types of data and an operating system (OS) to be executed by the CPU 130. The HDD 113 may be enabled by a storage device such as an optical disc or a solid state drive (SSD) with a semiconductor memory element such as a flash memory.

The memory 120 is a main storage device and may be enabled by, for example, a storage device such as a semiconductor memory element. In this case, the semiconductor memory element is a random access memory (RAM) or the like such as a synchronous dynamic random access memory (SDRAM). The memory 120 stores information to be used for a process to be executed by the CPU 130. The memory 120 may be coupled to the bus 114 or may be connected directly to the FPGA 140.

The CPU 130 executes various processes using the RAM of the memory 120 or the like as a work region in accordance with a program stored in a storage unit such as the HDD 113. For example, the CPU 130 is controlled by the OS or a virtual machine (VM) and executes the various processes.

The FPGA 140 executes user logic blocks obtained by offloading applications to be executed by the CPU 130. The FPGA 140 is coupled to the CPU 130 via the bus 114 (for example, PCIe) and a memory coherent bus (for example, OpenCAPI). For example, the FPGA 140 forms an offload circuit coupled to the CPU 130 via multiple links. The multiple links are not different type buses but may be buses of the same type.

Figure 3:
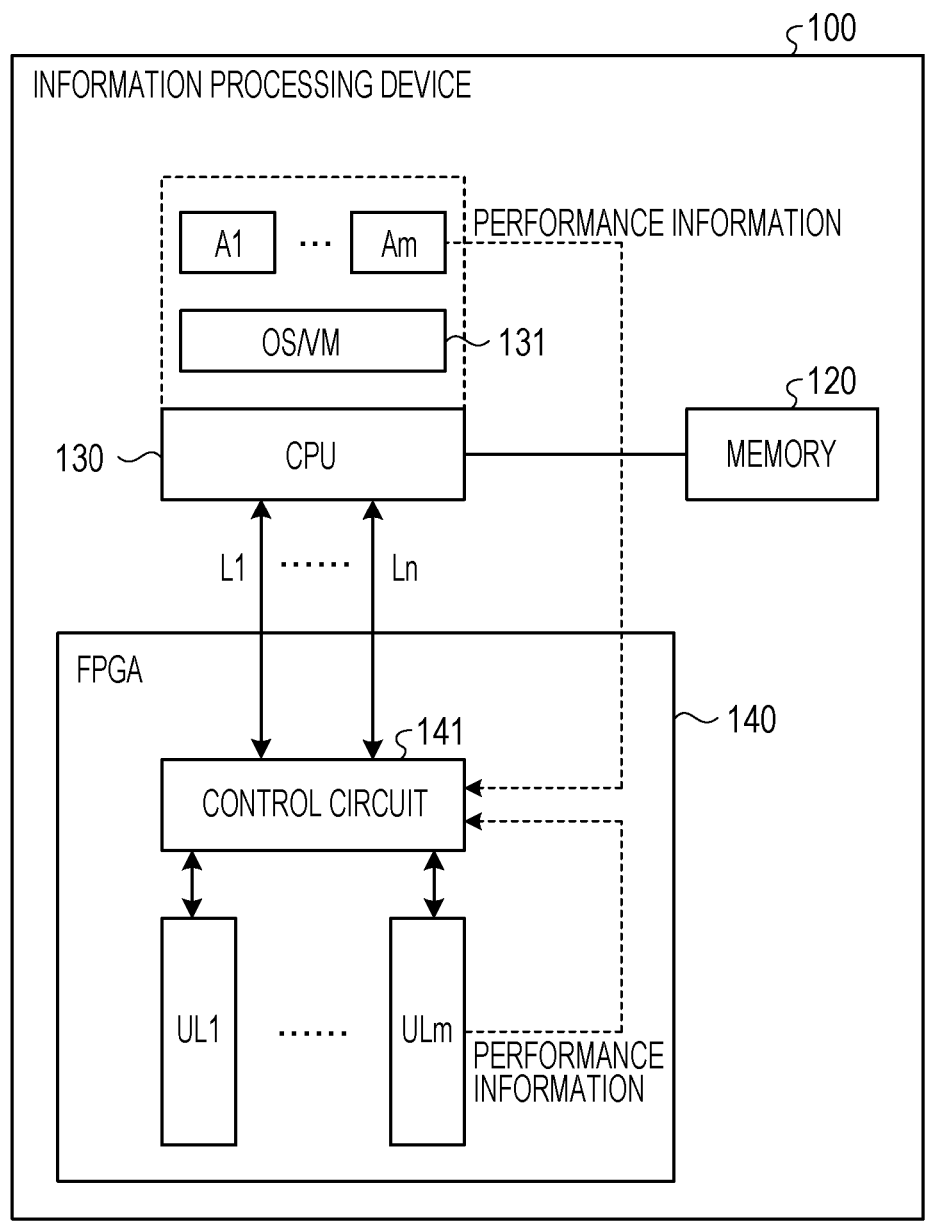
FIG. 3 is a block diagram illustrating an example of a functional configuration of the information processing device according to the embodiment.

FIG. 3 is a block diagram illustrating an example of a functional configuration of the information processing device according to the embodiment. As illustrated in FIG. 3, in the information processing device 100, an OS/VM 131, which includes the OS and/or the VM, is executed by the CPU 130, and applications A1 to Am are executed on the OS/VM 131. The FPGA 140 includes a control circuit 141 and multiple user logic blocks UL1 to Ulm. The control circuit 141 is coupled to the CPU 130 via links L1 to Ln. The links L1 to Ln correspond to the bus 114 and the memory coherent bus. The user logic blocks UL1 to Ulm are associated with the applications A1 to Am and communicate with the applications A1 to Am via the control circuit 141 and the links L1 to Ln. For example, the user logic blocks UL to ULm are logical circuits for computing processes of the applications A1 to Am. Each of the applications A1 to Am and the user logic blocks UL1 to Ulm uses any of the links U1 to Ln to output performance information to the control circuit 141. For example, when performance information satisfies a performance requirement, the performance information indicates "1". For example, when the performance information does not satisfy the performance requirement, the performance information indicates "0".

Figure 4:
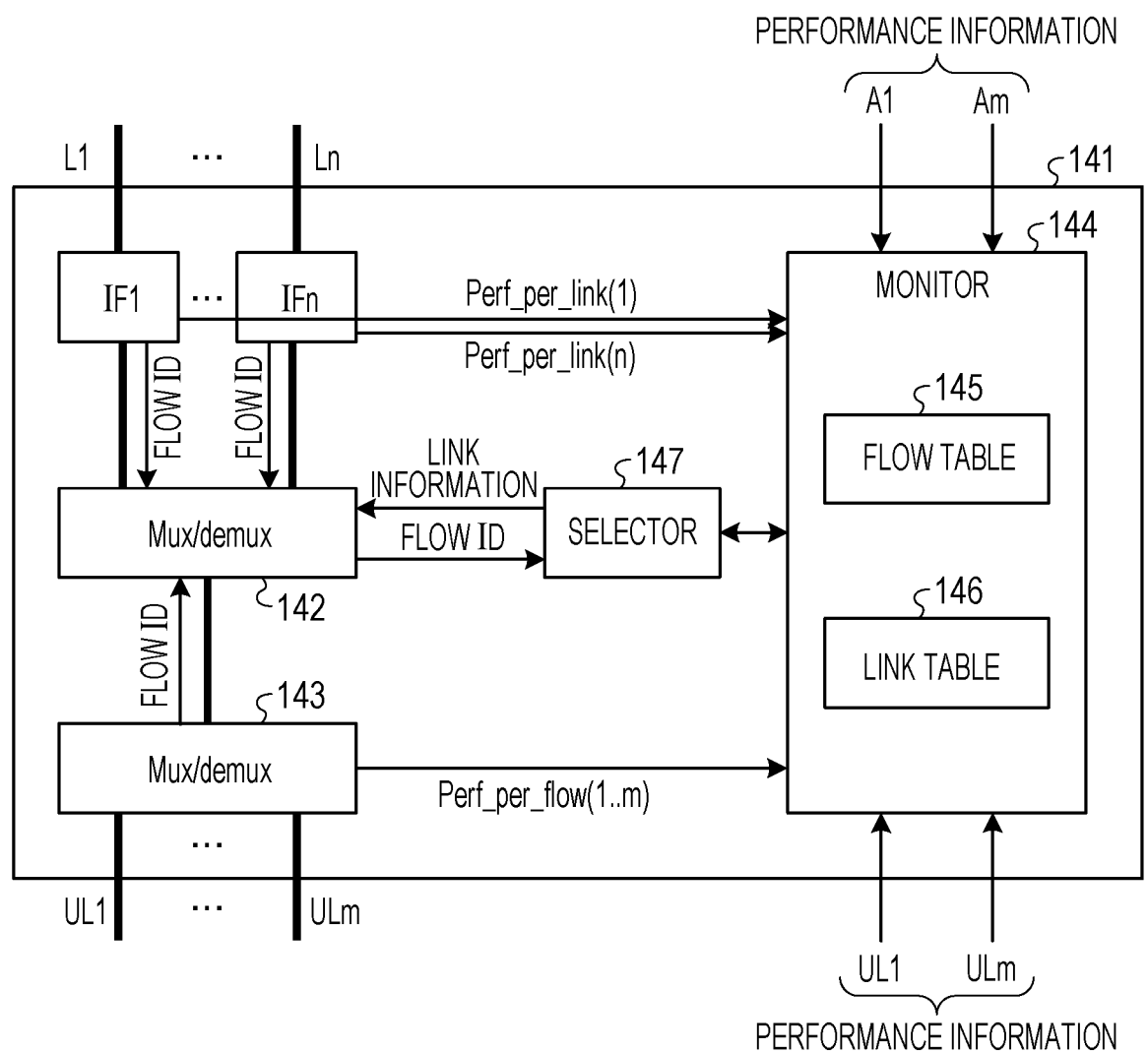
FIG. 4 is a block diagram illustrating an example of a functional configuration of a control circuit.

FIG. 4 is a block diagram illustrating an example of a functional configuration of the control circuit. As illustrated in FIG. 4, the control circuit 141 includes interfaces IF1 to IFn, a Mux/demux 142, a Mux/demux 143, a monitor 144, and a selector 147. The monitor 144 includes a flow table 145 and a link table 146.

The interfaces IF1 to IFn are associated with the links L1 to Ln. The interfaces IF1 to IFn output Perf_per_link(1) to (n) to the monitor 144. Perf_per_link(1) to (n) is data indicating bandwidths used by the links. The interfaces IF1 to IFn output flow identifiers (IDs) identifying flows to the Mux/demux 142. The flows are data flows based on combinations of the user logic blocks UL1 to Ulm, command types (read or write), and address ranges. The flow IDs are used to identify the flows.

The Mux/demux 142 is a multiplexer and demultiplexer. The Mux/demux 142 multiplexes flows received from the interfaces IF1 to IFn into a flow and outputs the multiplexed flow to the Mux/demux 143. The Mux/demux 142 restores a multiplexed flow received from the Mux/demux 143 to multiple flows and outputs the multiple flows to the corresponding interfaces IF1 to IFn. The Mux/demux 142 outputs flow IDs of the flows received from the interfaces IF1 to IFn and the Mux/demux 143 to the selector 147. The Mux/demux 142 receives link information associated with a flow ID from the selector 147. The Mux/demux 142 switches routes of the flows to output the corresponding flows to the interfaces IF1 to IFn based on the link information.

The Mux/demux 143 is a multiplexer and demultiplexer. The Mux/demux 143 extracts flows from packets received from the user logic blocks UL1 to Ulm, multiplexes the flows into a flow, and outputs the multiplexed flow to the Mux/demux 142. The Mux/demux 143 restores a multiplexed flow received from the Mux/demux 142 to multiple flows and outputs the multiple flows to the corresponding user logic blocks UL1 to Ulm. The Mux/demux 143 outputs flow IDs corresponding to the flows to the Mux/demux 142. The Mux/demux 143 outputs Perf_per_flow(1 . . . m) to the monitor 144. Perf_per_flow(1 . . . m) is data including flow information on the extracted flows and bandwidths used for the flows.

The monitor 144 collects bandwidths data used by the links L1 to Ln, bandwidths data used for the flows, and performance information and causes the collected bandwidths and the collected performance to be stored in the flow table 145. The flow table 145 and the link table 146 are described below with reference to FIGS. 5 and 6.

The flow table 145 stores link information (route information), priorities, performance information, and the like for the flows so that the link information, the priorities, the performance information, and the like are associated with each other. FIG. 5 is a diagram illustrating an example of the flow table. As illustrated in FIG. 5, the flow table 145 includes items for "flow IDs", "flow information", "link information", "priorities", and "performance information (current values)". The "flow information" includes items for "user logic blocks", "command types", and "address ranges". The "performance information (current values)" includes items for "application performance", "UL performance", and "bandwidths used".

The "flow IDs" indicate identifies identifying the flows. The "user logic blocks" indicate identifies identifying the user logic blocks associated with the flows. Each of the "command types" indicates information indicating read or write. When a "command type" indicates read and write, "R/W" is represented. The "address ranges" are information indicating address ranges associated with the flows. The "link information" indicates links to which the flows are currently allocated.

The "priorities" indicate priorities for the allocation of the flows. For example, the "priorities" are represented by 256 levels that are "0" to "255". In this case, as the value of a priority is larger, the priority is higher. The "application performance" is performance information collected from the applications A1 to Am. When "application performance" indicates OK, the "application performance" satisfies a performance requirement. When the "application performance" indicates not good (NG), the "application performance" does not satisfy the performance requirement. The fact that the "application performance" satisfies the performance requirement indicates that response time from the transmission of a request by an application to a user logic block to the reception of a response, throughput, or the like satisfies the requirement.

The "UL performance" is performance information collected from the user logic blocks UL1 to Ulm. When "UL performance" indicates OK, the "UL performance" satisfies a performance requirement. When the "UL performance" indicates NG, the "UL performance" does not satisfy the performance requirement. For example, the fact that the "UL performance" satisfies the performance requirement indicates that response time from the transmission of a response by a user logic block to an application to the reception of an ACK, the number of requests from the application per unit of time, or the like satisfies the requirement.

In the "application performance" and the "UL performance", OK corresponds to performance information "1" collected by the monitor 144, and NG corresponds to performance information "0" collected by the monitor 144. For example, registers for the applications A1 to Am and the user logic blocks UL1 to Ulm are installed in the monitor 144, each of the applications A1 to Am and the user logic blocks UL1 to Ulm writes "0" or "1" to a respective register, and the monitor 144 periodically references the registers and collects the information written to the registers. The "bandwidths used" are information indicating bandwidths of the links L1 to Ln used by the flows.

The link table 146 stores performance information of the links L1 to Ln. FIG. 6 is a diagram illustrating an example of the link table. As illustrated in FIG. 6, the link table 146 includes items for "link IDs" and "performance information". The "performance information" includes items for "maximum bandwidths" and "minimum delay".

The "link IDs" are identifiers identifying the links L1 to Ln. The "maximum bandwidths" are information indicating the maximum bandwidths usable by the links. The "minimum delay" is information indicating the minimum delay time in the links.

Returning to FIG. 4, the monitor 144 collects the bandwidths used and the performance information and controls the priorities of the flows. When the monitor 144 is turned on, the monitor 144 sets an initial state. As the initial state, the monitor 144 sets all the priorities indicated in the flow table 145 to "1". When the execution of the applications A1 to Am and the execution of the user logic blocks UL1 to Ulm are started, the monitor 144 updates the flow information, link information, and performance information of the flow table 145. For example, the monitor 144 acquires, from the applications, the flow IDs set upon the activation of the applications. For example, the monitor 144 deletes the flow IDs upon the termination of the applications in accordance with instructions from the applications.

For example, the monitor 144 updates the flow information of the flow table 145 based on flow information received from the Mux/demux 143. The monitor 144 references the link table 146, allocates the flows in order from a link with the highest usable bandwidth based on bandwidths used by the links and received from the interfaces IF1 to IFn, and updates the link information of the flow table 145. The monitor 144 updates the bandwidths used for the flows and indicated in the flow table 145 based on bandwidths received from the Mux/demux 143 and used for the flows. The monitor 144 references the registers for the applications A1 to Am and the user logic blocks UL1 to Ulm and updates the application performance and UL performance of the flow table 145.

When a certain flow for which application performance and UL performance indicate NG in the flow table 145 exists, the monitor 144 increments a priority of the certain flow. Next, the monitor 144 instructs the selector 147 to execute the switching process.

After the termination of the switching process, the monitor 144 references the flow table 145. When application performance or UL performance indicates NG for all the flows, the monitor 144 decrements the priorities of all the flows. In addition, the monitor 144 references the flow table 145. When the application performance and the UL performance indicate OK for all the flows, the monitor 144 decrements the priorities of all the flows, stands by during a fixed time period, updates the application performance and the UL performance again, and repeatedly controls the priorities.

In other words, the monitor 144 is an example of a collector for collecting values indicating performance information of the links for the flows corresponding to the processes of the applications and the maximum values indicated in the performance information and usable by the links. In addition, the monitor 144 collects values indicating bandwidths used by the links for the flows corresponding to the processes of the applications and the maximum values of bandwidths usable by the links. When a process of an application or the performance of a logical circuit does not satisfy a performance requirement, the monitor 144 increments a priority of a flow corresponding to the process of the application or corresponding to the logical circuit. Furthermore, the monitor 144 collects values indicating bandwidths used by the links and the maximum values of bandwidths usable by the links at each of predetermined time points.

When the selector 147 receives a flow ID from the Mux/demux 142, the selector 147 references the flow table 145 and outputs link information associated with the received flow ID to the Mux/demux 142. For example, the selector 147 references the flow table 145 and connects packets flowing in the links L1 to Ln to the appropriate user logic blocks UL1 to Ulm.

When the selector 147 is instructed by the monitor 144 to execute the switching process, the selector 147 executes the switching process of switching the association of the flows with the links. The selector 147 references the flow table 145 and determines whether an undetermined flow exists. When the selector 147 determines that the undetermined flow does not exist, the selector 147 terminates the switching process.

When the selector 147 determines that the undetermined flow exists, the selector 147 selects, as a target flow, a flow with the highest priority among undetermined flows. The selector 147 determines whether application performance and UL performance that are associated with the selected target flow indicate OK. When the selector 147 determines that the application performance and the UL performance indicate OK, the selector 147 makes the determination on a next flow.

When the selector 147 determines that the application performance and the UL performance do not indicate OK, the selector 147 references the flow table 145 and the link table 146 and selects a link with the highest usable bandwidth. The selector 147 determines whether the selected link is the same as a link for the target flow. When the selector 147 determines that the selected link is the same as the link for the target flow, the selector 147 makes the determination on the next flow.

When the selector 147 determines that the selected link is not the same as the link for the target flow, the selector 147 sets the selected link for the target flow. The selector 147 determines whether a bandwidth used by the selected link is equal to or lower than the maximum bandwidth of the selected link. When the selector 147 determines that the bandwidth used by the selected link is equal to or lower than the maximum bandwidth of the selected link, the selector 147 terminates the switching process.

When the selector 147 determines that the bandwidth used by the selected link is higher lower than the maximum bandwidth of the selected link, the selector 147 references the flow table 145 and selects a flow with the lowest priority among flows that use the selected link. The selector 147 sets the original link for the target flow to a link for the selected flow with the lowest priority and terminates the switching process. For example, the selector 147 switches between the original link for the target low and the link for the lowest priority.

In other words, the selector 147 determines a flow not satisfying requested performance information based on the values indicating the performance information of the links for the flows. The selector 147 selects a link to which the flow is to be allocated, based on the maximum values indicated in the performance information and usable by the links and values indicated in the performance information and currently used by the links. The selector 147 is an example of a selector. For example, the selector 147 determines a flow not satisfying a requested bandwidth based on values indicating bandwidths used by the links for the flows. The selector 147 selects a link to which the flow is to be allocated, based on the maximum values of bandwidths usable by the links and values of bandwidths currently used by the links. Then, the selector 147 allocates the flow to the selected link.

The selector 147 selects a link to which a flow is to be allocated, based on the maximum values of bandwidths usable by the links and values of bandwidths currently used by the links. When the selector 147 allocates the flow to the selected link to which the flow is to be allocated, and a bandwidth used by the selected link to which the flow has been allocated exceeds the maximum value of the bandwidth usable by the selected link to which the flow has been allocated, the selector 147 allocates, to a link from which the flow has been allocated, a flow with the lowest priority among flows that use the selected link to which the flow has been allocated. In addition, the selector 147 determines a flow not satisfying a requested bandwidth at each of the predetermined time points.

Figure 7:
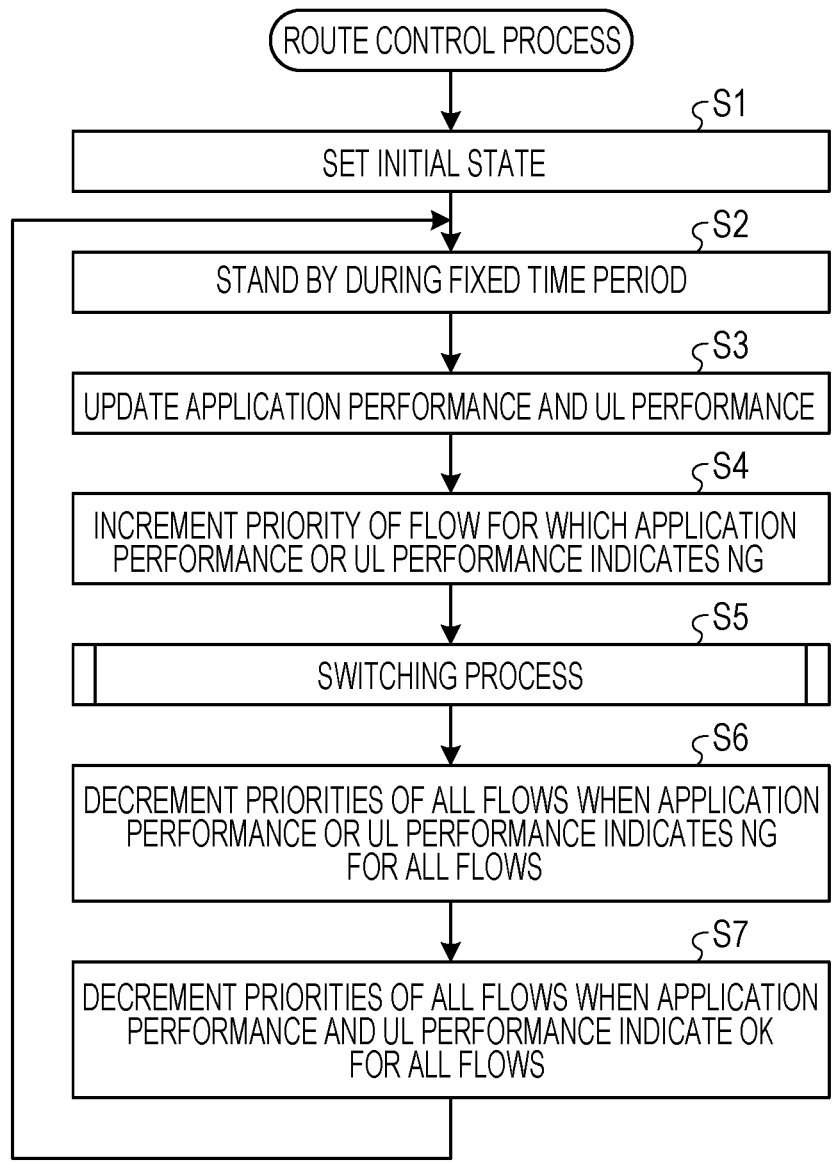
FIG. 7 is a flowchart illustrating an example of a route control process according to the embodiment.

Next, operations of the information processing device 100 according to the embodiment are described. FIG. 7 is a flowchart illustrating an example of a route control process according to the embodiment.

When the monitor 144 of the control circuit 141 is turned on, the monitor 144 sets the initial state (in step S1). When the execution of the applications A1 to Am and the execution of the user logic blocks UL1 to Ulm are started, the monitor 144 updates the flow information, link information, and performance information of the flow table 145. After the start of the execution, the monitor 144 stands by during a fixed time period (in step S2).

After that, the monitor 144 references the registers for the applications A1 to Am and the user logic blocks UL1 to Ulm and updates the application performance and UL performance of the flow table 145 (in step S3).

The monitor 144 increments a priority of a flow for which application performance or UL performance indicates NG in the flow table 145 (in step S4). Then, the monitor 144 instructs the selector 147 to execute the switching process (in step S5).

The switching process is described below with reference to FIG. 8. FIG. 8 is a flowchart illustrating an example of the switching process according to the embodiment.

When the selector 147 is instructed by the monitor 144 to execute the switching process, the selector 147 executes the switching process of switching the association of the flows to the links. The selector 147 references the flow table 145 and determines whether an undetermined flow exists (in step S51). When the selector 147 determines that the undetermined flow does not exist (No in step S51), the selector 147 terminates the switching process and causes the switching process to return to the route control process.

When the selector 147 determines that the undetermined flow exists (Yes in step S51), the selector 147 selects, as a target flow, a flow with the highest priority among undetermined flows (in step S52). The selector 147 determines whether application performance and UL performance that are associated with the selected target flow indicate OK (in step S53). When the selector 147 determines that the application performance and the UL performance indicate OK (Yes in step S53), the selector 147 causes the switching process to return to step S51 to make the determination on a next flow.

When the selector 147 determines that the application performance and the UL performance do not indicate OK (No in step S53), the selector 147 references the flow table 145 and the link table 146 and selects a link with the highest usable bandwidth (in step S54). The selector 147 determines whether the selected link is the same as a link for the target flow (in step S55). When the selector 147 determines that the selected link is the same as the link for the target flow (Yes in step S55), the selector 147 causes the switching process to return to step S51 to make the determination on the next flow.

When the selector 147 determines that the selected link is not the same as the link for the target link (No in step S55), the selector 147 sets the selected link for the target flow (in step S56). The selector 147 determines whether a bandwidth used by the selected link is equal to or lower than the maximum bandwidth of the selected link (in step S57). When the bandwidth used by the selected link is equal to or lower than the maximum bandwidth of the selected link (Yes in step S57), the selector 147 terminates the switching process and causes the switching process to return to the route control process.

When the selector 147 determines that the bandwidth used by the selected link is higher than the maximum bandwidth of the selected link (No in step S57), the selector 147 references the flow table 145 and selects a flow with the lowest priority among flows that use the selected link (in step S58). The selector 147 sets the original link for the target flow to a link for the selected flow with the lowest priority (in step S59), terminates the switching process, and causes the switching process to return to the route control process. By executing this, the selector 147 may allocate the flows to the links in order from a flow with the highest priority.

Returning to FIG. 7, after the termination of the switching process, the monitor 144 references the flow table 145. Then, when application performance or UL performance indicates NG for all the flows, the monitor 144 decrements priorities of all the flows (in step S6). The monitor 144 references the flow table 145. When application performance and UL performance indicate OK for all the flows, the monitor 144 decrements the priorities of all the flows (in step S7) and causes the route control process to return to step S2. Thus, the control circuit 141 may allocate the flows so that the performance of the entire system is maximized. In addition, the control circuit 141 may automatically determine a communication pattern that maximizes the performance of the entire system without depending on the user logic blocks. Furthermore, the control circuit 141 may reduce a portion that depends on an FPGA connection scheme of the user logic blocks. For example, a user logic block of the information processing device 100 may be easily migrated to another system. Since interface design may be made common in the information processing device 100, the number of processes for development may be reduced.

Although the bandwidths used are treated as the performance information of the links in the embodiment, the embodiment is not limited to this. For example, latency times may be used as the performance information of the links. In this case, the control circuit 141 connects a latency checker to the Mux/demux 142, periodically transmits a packet for measurement to each of the links to acquire latency information, and allocates the flows to the links based on the acquired latency information. For example, the monitor 144 collects values indicating latency times of the links for the flows corresponding to the processes of the applications and maximum values of the latency times of the links. The selector 147 determines a flow not satisfying a requested latency time based on the values indicating the latency times of the links for the flows. The selector 147 selects a link to which the flow is to be allocated, based on the maximum values of the latency times of the links and values of current latency times of the links. Then, the selector 147 allocates the flow to the selected link.

The information processing device 100 includes the offload circuit coupled to the CPU via the multiple links. The offload circuit includes, as the FPGA 140, the control circuit 141 and the logical circuits that are the user logic blocks. The logical circuits compute the processes of the applications. The control circuit 141 collects the values indicating the performance information of the links for the flows corresponding to the processes of the applications and the maximum values indicated in the performance information and usable by the links. In addition, the control circuit 141 determines a flow not satisfying requested performance information based on the values indicating the performance information of the links for the flows. Furthermore, the control circuit 141 selects a link to which the flow is to be allocated, based on the maximum values indicated in the performance information and usable by the links and values indicated in the performance information and currently used by the links. Then, the control circuit 141 allocates the flow to the selected link. As a result, the control circuit 141 may allocate the flows so that the performance of the entire system is maximized.

The control circuit 141 collects values indicating bandwidths used by the links for the flows corresponding to the processes of the applications and the maximum values of the bandwidths usable by the links. In addition, the control circuit 141 determines a flow not satisfying a requested bandwidth based on the values indicating the bandwidths used by the links for the flows. Furthermore, the control circuit 141 selects a link to which the flow is to be allocated, based on the maximum values of the bandwidths usable by the links and the values of bandwidths currently used by the links. Then, the control circuit 141 allocates the flow to the selected link. As a result, the control circuit 141 may allocate the flows so that the performance of the entire system is maximized based on the bandwidths used by the links.

When a process of an application or the performance of a logical circuit does not satisfy a performance requirement, the control circuit 141 increments a priority of a flow corresponding to the process of the application or corresponding to the logical circuit. As a result, the control circuit 141 may allocate the flow based on the priority.

In addition, the control circuit 141 selects a link to which a flow is to be allocated, based on the maximum values of the bandwidths usable by the links and the values of the bandwidths currently used by the links. When the control circuit 141 allocates the flow to the selected link to which the flow is to be allocated, and a bandwidth used by the selected link to which the flow has been allocated exceeds the maximum value of a bandwidth usable by the selected link to which the flow has been allocated, the control circuit 141 allocates, to a link from which the flow has been allocated, a flow with the lowest priority among flows that use the selected link to which the flow has been allocated. As a result, the control circuit 141 may switch between a link used for a flow with a high priority and a link used for a flow with a low priority.

The control circuit 141 collects values indicating bandwidths used by the links and the maximum values of the bandwidths usable by the links at each of the predetermined time points. In addition, the control circuit 141 determines a flow not satisfying a requested bandwidth at each of the predetermined time points. As a result, the control circuit 141 may dynamically allocate the flows.

The control circuit 141 collects values indicating latency times of the links for the flows corresponding to the processes of the applications and the maximum values of the latency times of the links. In addition, the control circuit 141 determines a flow not satisfying requested latency times based on the values indicating the latency times of the links for the flows. The control circuit 141 selects a link to which the flow is to be allocated, based on the maximum values of the latency times of the links and values of current latency times of the links. Then, the control circuit 141 allocates the flow to the selected link. As a result, the control circuit 141 may allocate the flows so that the performance of the entire system is maximized based on the latency times of the links.

The constituent elements of the units and sections illustrated in the drawings might not be physically configured as illustrated in the drawings. Specific forms of distribution and integration of the units and sections are not limited to those illustrated in the drawings, and all or some of the units and sections may be functionally or physically distributed or integrated in arbitrary units based on various loads, usage states, and the like. For example, the Mux/demux 142 and the Mux/demux 143 may be unified to form a crossbar switch. The processes described with reference to the drawings might not be executed in the aforementioned order. Two or more of the processes described with reference to the drawings may be executed simultaneously without contradiction of the details of the processes. The order that a certain process among the processes described with reference to the drawings is executed and the order that another process among the processes described with reference to the drawings is executed may be switched with each other without contradiction of the details of the processes.

All or some of the various processing functions to be executed by the control circuit 141 may be executed by the CPU (or an MPU or a micro controller unit (MCU)). In addition, all or some of the various processing functions may be executed by a program analyzed and executed by the CPU (or a microcomputer such as an MPU or an MCU) or may be executed by hardware based on wired logic.

The control circuit 141 described in the embodiment may read and execute the program, thereby executing the same functions as the processes described with reference to FIGS. 4, 7, 8, and the like. For example, the control circuit 141 may execute the same processes as the processes of the monitor 144 and the selector 147, thereby executing the same processes as those described in the embodiment.

The program may be distributed via a network such as the Internet. The program may be stored in a computer-readable recording medium such as a hard disk, a flexible disk (FD), a CD-ROM, an MO disc, or a DVD, read by a computer from the recording medium, and executed by the computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
   a processor; and
   an offload circuit coupled to the processor via links, the offload circuit including:
   a first circuit that computes processes of applications,
   a second circuit that collects values indicating performance information of the links for flows corresponding to the processes of the applications and maximum values indicated in performance information and usable by the links, and
   a third circuit that determines a flow not satisfying requested performance information based on the values indicating the performance information of the links for the flows, selects a link to which the flow is to be allocated, based on the maximum values indicated in the performance information and usable by the links and values indicated in performance information and currently used by the links, and allocates the flow to the selected link,
   the second circuit collects values indicating bandwidths used by the links for the flows corresponding to the processes of the applications and the maximum values of bandwidths usable by the links, and
   the third circuit determines a flow not satisfying a requested bandwidth based on the values indicating the bandwidths used by the links for the flows, selects a link to which the flow is to be allocated, based on the maximum values of the bandwidths usable by the links and values of bandwidths currently used by the links, and allocates the flow to the selected link,
   when the third circuit selects the link to which the flow is to be allocated, based on the maximum values of the bandwidths usable by the links and the values of the bandwidths currently used by the links, and allocates the flow to the selected link to which the flow is to be allocated, and a bandwidth used by the selected link to which the flow has been allocated exceeds the maximum value of a bandwidth usable by the selected link to which the flow has been allocated, the third circuit allocates, to a link from which the flow has been allocated, a flow with the lowest priority among flows that use the selected link to which the flow has been allocated.

2. The information processing device according to claim 1, wherein when a process of an application or the performance of the first circuit does not satisfy a performance requirement, the second circuit increments a priority of a flow corresponding to the process of the application or corresponding to the first circuit.

3. The information processing device according to claim 1, wherein
the second circuit collects values indicating bandwidths used by the links and the maximum values of bandwidths usable by the links at each of predetermined time points, and
the third circuit determines a flow not satisfying the requested bandwidth at each of the predetermined time points.

4. The information processing device according to claim 1, wherein
the second circuit collects values indicating latency times of the links for the flows corresponding to the processes of the applications and maximum values of the latency times of the links, and
the third circuit determines a flow not satisfying a requested latency time based on the values indicating the latency times of the links for the flows, selects a link to which the flow is to be allocated, based on the maximum values of the latency times of the links and values of current latency times of the links, and allocates the flow to the selected link.

5. The information processing device according to claim 1, wherein the offload circuit is a field programmable gate array.

6. The information processing device according to claim 1, wherein the links includes at least one link having a different bandwidth than a bandwidth of a link.

7. The information processing device according to claim 1, wherein the links includes at least one link having a different latency time than a latency time of a link.

8. The information processing device according to claim 1, wherein the links include at least one bus of a different type than a bus of a link.

9. A method executed by an offload circuit configured to be coupled to a processor via links, comprising:
computing processes of applications,
collecting values indicating performance information of the links for flows corresponding to the processes of the applications and maximum values indicated in performance information and usable by the links, and
determining a flow not satisfying requested performance information based on the values indicating the performance information of the links for the flows, selecting a link to which the flow is to be allocated, based on the maximum values indicated in the performance information and usable by the links and values indicated in performance information and currently used by the links, and allocating the flow to the selected link,
the second circuit collects values indicating bandwidths used by the links for the flows corresponding to the processes of the applications and the maximum values of bandwidths usable by the links, and
the third circuit determines a flow not satisfying a requested bandwidth based on the values indicating the bandwidths used by the links for the flows, selects a link to which the flow is to be allocated, based on the maximum values of the bandwidths usable by the links and values of bandwidths currently used by the links, and allocates the flow to the selected link,
when the third circuit selects the link to which the flow is to be allocated, based on the maximum values of the bandwidths usable by the links and the values of the bandwidths currently used by the links, and allocates the flow to the selected link to which the flow is to be allocated, and a bandwidth used by the selected link to which the flow has been allocated exceeds the maximum value of a bandwidth usable by the selected link to which the flow has been allocated, the third circuit allocates, to a link from which the flow has been allocated, a flow with the lowest priority among flows that use the selected link to which the flow has been allocated.

10. A non-transitory FPGA (field-programmable gate array)-readable recording medium storing therein a program for causing an FPGA to execute a process, the FPGA being coupled to a processor via links, the process comprising:
computing processes of applications,
collecting values indicating performance information of the links for flows corresponding to the processes of the applications and maximum values indicated in performance information and usable by the links, and
determining a flow not satisfying requested performance information based on the values indicating the performance information of the links for the flows, selecting a link to which the flow is to be allocated, based on the maximum values indicated in the performance information and usable by the links and values indicated in performance information and currently used by the links, and allocating the flow to the selected link,
the second circuit collects values indicating bandwidths used by the links for the flows corresponding to the processes of the applications and the maximum values of bandwidths usable by the links, and the third circuit determines a flow not satisfying a requested bandwidth based on the values indicating the bandwidths used by the links for the flows, selects a link to which the flow is to be allocated, based on the maximum values of the bandwidths usable by the links and values of bandwidths currently used by the links, and allocates the flow to the selected link,
when the third circuit selects the link to which the flow is to be allocated, based on the maximum values of the bandwidths usable by the links and the values of the bandwidths currently used by the links, and allocates the flow to the selected link to which the flow is to be allocated, and a bandwidth used by the selected link to which the flow has been allocated exceeds the maximum value of a bandwidth usable by the selected link to which the flow has been allocated, the third circuit allocates, to a link from which the flow has been allocated, a flow with the lowest priority among flows that use the selected link to which the flow has been allocated.

* * * * *